US 7,773,240 B2

(12) United States Patent
Parry et al.

(10) Patent No.: US 7,773,240 B2
(45) Date of Patent: Aug. 10, 2010

(54) IMAGE FORMING DEVICES AND METHODS OF ASSISTING WITH MAINTENANCE OF IMAGE FORMING DEVICE CONSUMABLES

(75) Inventors: Travis J. Parry, Boise, ID (US); Robert D. Christiansen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1960 days.

(21) Appl. No.: 09/861,991

(22) Filed: May 18, 2001

(65) Prior Publication Data

US 2002/0171860 A1 Nov. 21, 2002

(51) Int. Cl.
G06K 15/00 (2006.01)
G06F 3/12 (2006.01)
G03G 15/00 (2006.01)
G01C 21/34 (2006.01)
G01C 21/36 (2006.01)
G06Q 30/00 (2006.01)

(52) U.S. Cl. .................. 358/1.14; 358/1.15; 399/9; 705/6; 705/26

(58) Field of Classification Search ............... 358/1.14, 358/1.15, 1.9; 399/9, 12, 23–30, 35, 61, 399/110, 111, 119, 120, 258, 262; 347/19, 347/7; 705/6, 26; 707/6
See application file for complete search history.

(56) References Cited

U.S. PATENT DOCUMENTS

| 5,850,583 | A | * | 12/1998 | Song et al. ............. 399/24 |
| 5,956,487 | A |   | 9/1999 | Venkatraman et al. |
| 6,016,496 | A | * | 1/2000 | Roberson ............ 707/103 R |
| 6,031,623 | A |   | 2/2000 | Smith et al. |
| 6,130,757 | A | * | 10/2000 | Yoshida et al. ........... 358/1.15 |
| 6,405,178 | B1 | * | 6/2002 | Manchala et al. ........... 705/29 |
| 6,658,423 | B1 | * | 12/2003 | Pugh et al. ............ 707/102 |
| 6,704,729 | B1 | * | 3/2004 | Klein et al. ............. 707/5 |
| 6,714,744 | B2 | * | 3/2004 | Arima ................ 399/23 |
| 6,798,997 | B1 | * | 9/2004 | Hayward et al. ........... 399/12 |
| 2002/0042747 | A1 | * | 4/2002 | Istvan ................. 705/26 |
| 2002/0091689 | A1 | * | 7/2002 | Wiens et al. ............ 707/6 |
| 2002/0111873 | A1 | * | 8/2002 | Ehrlich et al. ........... 705/26 |
| 2002/0128920 | A1 | * | 9/2002 | Chopra ................ 705/26 |
| 2005/0091211 | A1 | * | 4/2005 | Vernau et al. ............ 707/6 |

OTHER PUBLICATIONS

The Hard Copy Observer, 'Pipeline's Internet Printing System Lets the Printer Surf the Web', Mar. 1997, vol. VII No. 3, pp. 45-46.*
JVM; http://coverage.cnet.com/Resources/Info/Glossary/Terms/jvm.html; Jan. 8, 2001; 1 p.
"The Java Virtual Machine"; Bill Venners; http://www.artima.com/insidejvm/ed2/ch05JavaVirtualMachine1.html; Jan. 8, 2001; 3pps.

* cited by examiner

Primary Examiner—James A Thompson

(57) ABSTRACT

Image forming devices and methods of assisting with maintenance of image forming device consumables are described. According to one aspect, an image forming device includes: an image engine configured to utilize a consumable to form hard images; an interface adapted to communicate with a network comprising a plurality of network devices external of the image forming device; and processing circuitry coupled with the image engine and configured to forward a search request to the interface for communication to the network, to receive information regarding the consumable from the plurality of network devices via the interface responsive to the search request, to generate a message including information received from at least one of the network devices, and to control communication of the message.

23 Claims, 3 Drawing Sheets

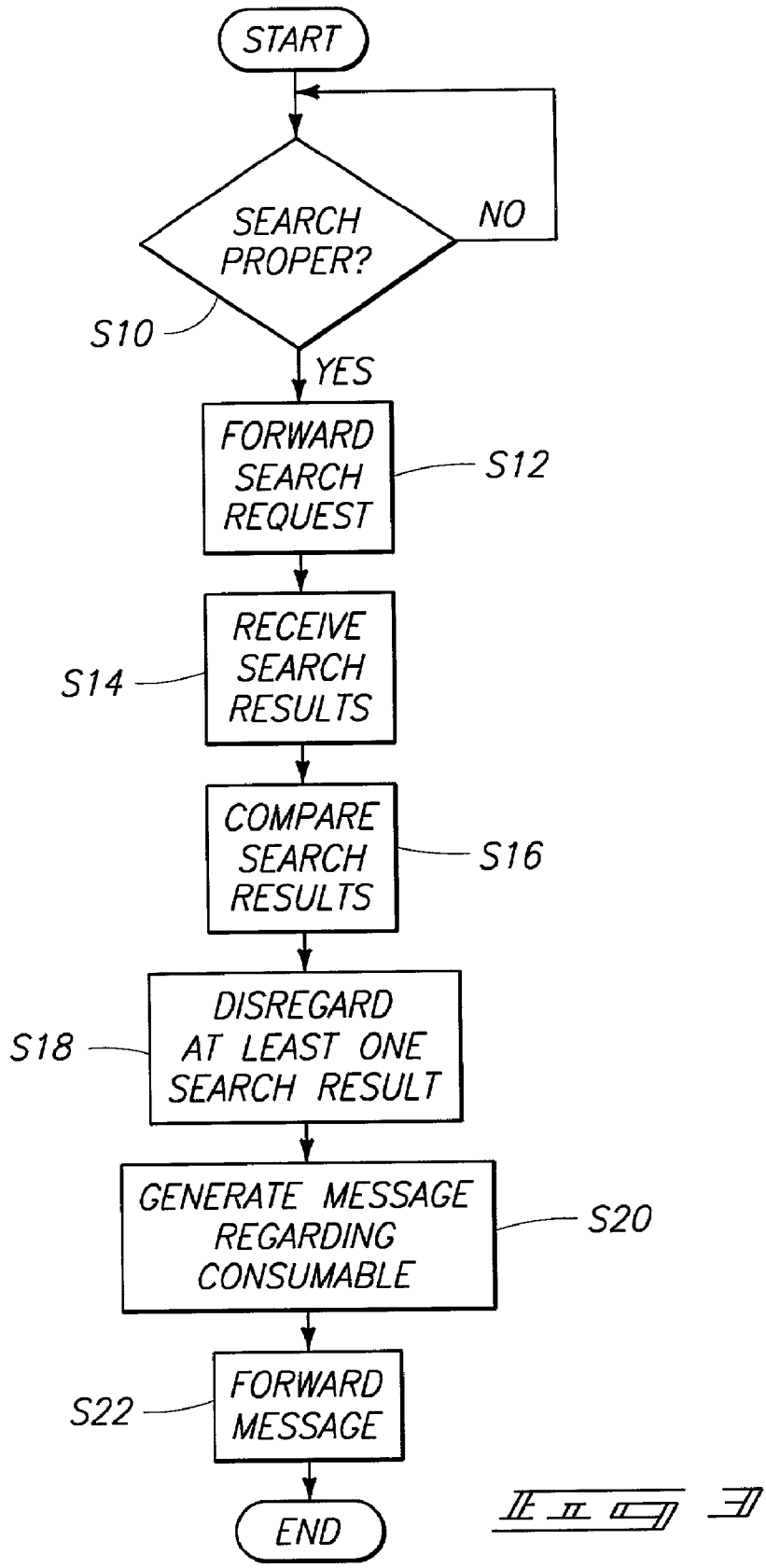

IMAGE FORMING DEVICES AND METHODS OF ASSISTING WITH MAINTENANCE OF IMAGE FORMING DEVICE CONSUMABLES

FIELD OF THE INVENTION

This invention relates to image forming devices and methods of assisting with maintenance of image forming device consumables.

BACKGROUND OF THE INVENTION

Imaging devices, such as laser printers, ink printers, etc. are utilized in numerous home and office applications. The increasing sophistication of both imaging devices and personal computers generally has resulted in heightened reliance upon proper operation of the devices in everyday home and work environments.

In some work environments, a dedicated administrator may be responsible for maintaining numerous computers and associated imaging devices. Typical imaging devices utilize consumables to form images. Accordingly, the consumables need to be replaced from time to time dependent upon the frequency of use and other factors. With a large number of devices to monitor, maintaining consumables for all devices becomes time consuming to insure supplies are on hand without having relatively huge inventories. Without the proper consumables, the image devices may not be properly utilized and productivity is adversely effected.

Accordingly, there exists a need to provide improved devices and methodologies to assist with maintenance of consumables.

SUMMARY OF THE INVENTION

The invention provides image forming devices and methods of assisting with maintenance of image forming device consumables.

According to an aspect of the invention, an image forming device includes: an image engine configured to utilize a consumable to form hard images; an interface adapted to communicate with a network comprising a plurality of network devices external of the image forming device; and processing circuitry coupled with the image engine and configured to forward a search request to the interface for communication to the network, to receive information regarding the consumable from the plurality of the network devices via the interface responsive to the search request, to generate a message including information received from at least one of the network devices, and to control communication of the message.

A second aspect of the invention provides a method of assisting with maintenance of image forming device consumables comprising: providing an image forming device configured to use a consumable to form a plurality of hard images; communicating a search request regarding the consumable to a network including a plurality of network devices using the image forming device; receiving information regarding the consumable within the image forming device from a plurality of the network devices responsive to the communicating; and communicating a message including information regarding the consumable received from at least one of the network devices, and the communicating comprises communicating using the image forming device.

Another aspect of the invention provides a method of assisting with maintenance of image forming device consumables comprising: providing a printer configured to use a consumable to print a plurality of hard images; storing a plurality of identifiers within the printer; formulating a search request regarding the consumable; communicating the search request to a network including a plurality of network devices using the image forming device, the communicating the search request comprising using the identifiers; receiving price information regarding the consumable within the image forming device from the network devices responsive to the communicating; selecting information received from one of the network devices using the image forming device and disregarding information received from another of the network devices, the selecting and the disregarding comprise comparing the price information from the one network device with the price information from the another network device and disregarding the price information from the another network device greater than the price information from the one network device; and communicating a message including the price information regarding the consumable received from the one network device and an identifier of the one network device having the lowest price information, and wherein the communicating the message comprises communicating the message not including the disregarded information. Other aspects of the invention are described herein.

Other features and advantages of the invention will become apparent to those of ordinary skill in the art upon review of the following detailed description, claims, and drawings.

DESCRIPTION OF THE DRAWINGS

FIG. 3 is a flow chart of an exemplary methodology performed by an image forming device of the image forming system of FIG. 1.

DETAILED DESCRIPTION OF PREFERRED EMBODIMENTS

Figure 1:
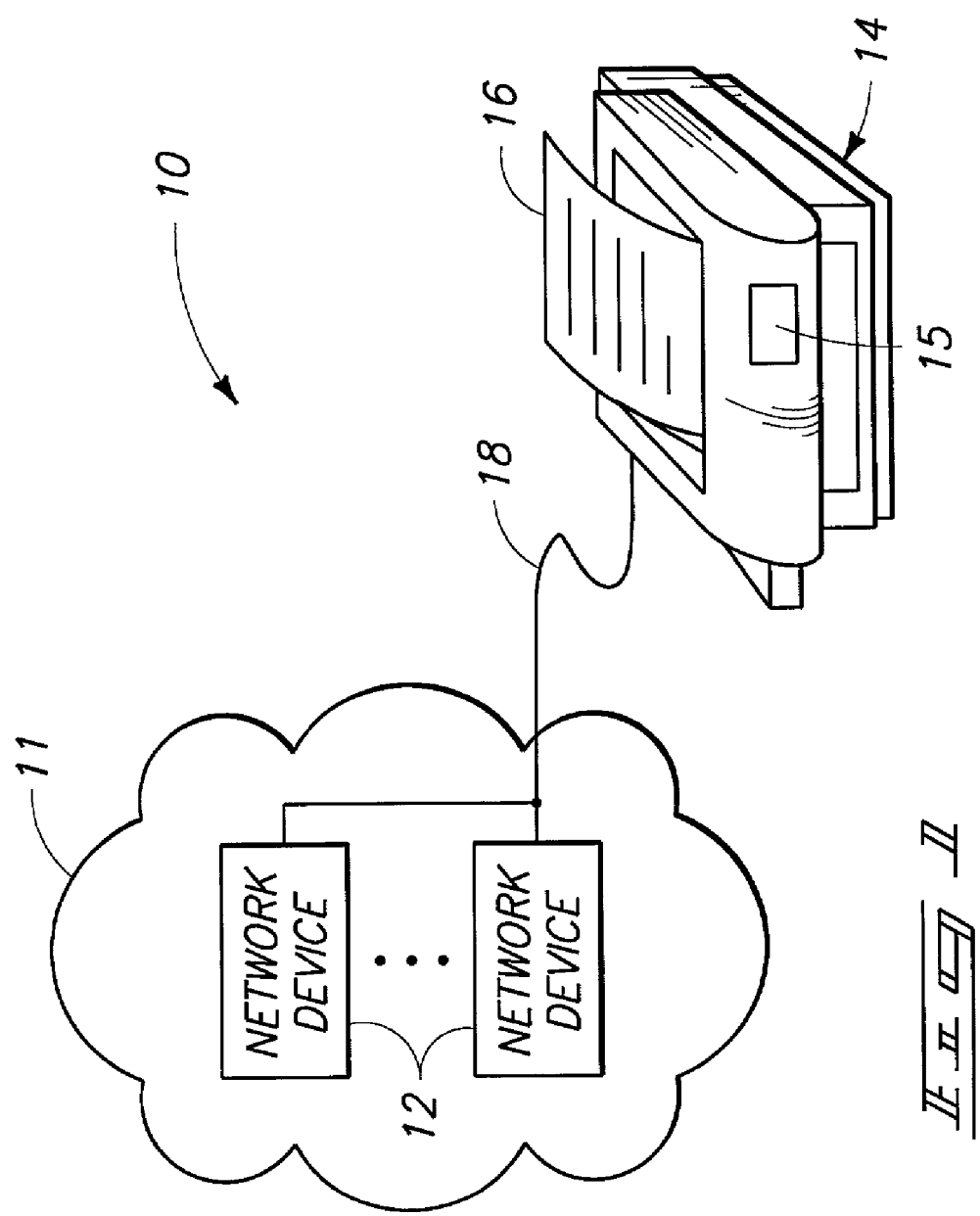
FIG. 1 is an illustrative representation of an exemplary image forming system.

FIG. 1 depicts an image forming system 10 including a network 11 comprising a plurality of network devices 12 coupled with an image forming device 14. Network 11 may be implemented in a private network arrangement (such as an intranet), public network arrangement (such as the Internet), a combination of private and public devices or other configurations capable of communicating digital information.

Network devices 12 are configured to communicate with one another and with image forming device 14 in the described embodiment. Exemplary network devices 12 include personal computers, workstations, servers, routers and other devices capable of communicating digital information. An exemplary image forming device 14 includes a printer, facsimile device, copier, multiple-function device, or other device capable of forming hard images upon media 16 comprising paper, labels, transparencies, roll media, etc. The illustrated image forming device 14 includes a display 15 to indicate status, alarm conditions, consumable status and other conditions of image forming device 14.

Network device 12 and image forming device 14 are coupled via an appropriate communication connection 18. In an exemplary network arrangement, connection 18 is coupled with respective network interface cards of network devices 12 and image forming device 14. Connection 18 implements bidirectional communications intermediate one or more network device 12 and image forming device 14 and other arrangements of connection 18 are possible.

Figure 2:
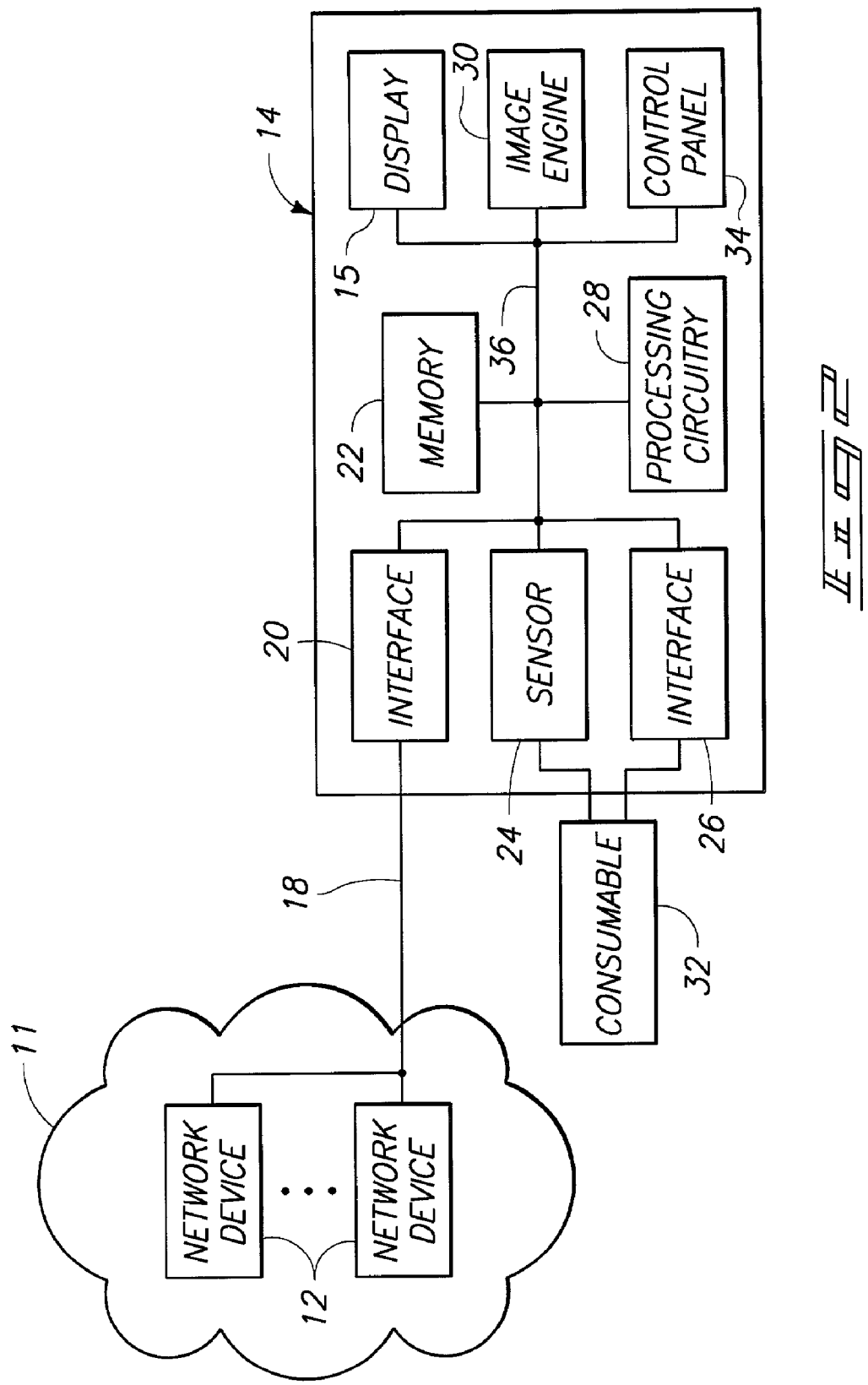
FIG. 2 is a functional block diagram of the image forming system of Fig.

Referring to FIG. 2, the depicted exemplary configuration of image forming device 14 includes an interface 20, a memory 22, a sensor 24, an interface 26, processing circuitry 28, an image engine 30 and a control panel 34. A bus 36 is implemented to provide communications intermediate components of image forming device 14. Some of the depicted components are optional and other arrangements of image forming device 14 configured to form hard images are possible. The exemplary embodiment herein will be discussed with reference to a printer application although the present invention applies to other image forming device configurations capable of forming hard images.

Interface 20 is configured to couple with connection 18 and to implement communication between network devices 12 of network 11 and image forming device 14. Interface 20 comprises different configurations depending upon the application of image forming device 14. For example, interface 20 comprises a network interface card (NIC) in one embodiment.

Memory 22 stores digital information and instructions. For example, memory 22 is configured to store image data to be imaged using image engine 30, executable instructions usable by processing circuitry 28 to implement imaging operations and control operations of image forming device 14, as well as other digital data to be stored within image forming device 14. Memory 22 comprises random access memory, read only memory, and/or flash memory in one example.

In the described embodiment, memory 22 includes executable code to configure processing circuitry 28 as an embedded web server (EWS) which communicates with devices 12 of network 11. Embedded web server concepts are described in U.S. Pat. No. 5,956,487, incorporated herein by reference. Such functionality enables processing circuitry 28 to communicate with network devices 12 of network 11, to forward search requests to such devices, to receive search results, to serve up web pages, etc.

In one exemplary configuration, memory 22 includes code to further configure processing circuitry 28 as a virtual machine, such as a Java Virtual Machine (JVM)™. Memory 22 includes scripts, such as JavaScripts™, which are executed by processing circuitry 28 to implement searching operations of network 11 and subsequent processing of the search results to provide messages regarding the information of the consumables received responsive to the search requests. Such searching and messaging operations are discussed in further detail below according to aspects of the invention.

As shown in FIG. 2, a consumable 32 is associated with image forming device 14 for use in the formation of hard images. Exemplary consumables include a developing material or agent (e.g., toner), sheet media, staples and any other materials consumed during the formation of hard images. Although consumable 32 is depicted outside of image forming device 14 in FIG. 2, it is to be understood that consumable 32 may also be provided within image forming device 14 or, alternatively, one or more consumable may be external of image forming device 14 while one or more consumable is provided within image forming device 14 in a given configuration.

In the depicted arrangement of image forming device 14, sensor 24 is configured to monitor a state or status of consumable 32. For example, sensor 24 may monitor a quantity of sheet media remaining within an appropriate media tray. Alternatively, sensor 24 monitors the weight or other status of a consumable. For example, sensor 24 applies an electrical charge to consumable 32 comprising toner and measures the resistance to monitor the status of the toner. Sensor 24 communicates signals indicative of the status of consumable 32 for utilization by other components of image forming device 14. Alternatively, processing circuitry 28 monitors usage of consumables and calculates the status of the consumable.

Processing circuitry 28 is configured to execute executable instructions to control operations of image forming device 14. For example, processing circuitry 28 controls image engine 30 to implement imaging operations. Processing circuitry 28 also performs operations with respect to maintenance, monitoring and replenishment of consumables as described herein. Processing circuitry 28 is configured to execute executable instructions stored within memory 22 and comprising for example, software and/or firmware instructions. Exemplary processing circuitry 28 comprises a microprocessor.

Image engine 30 uses consumables to implement the formation of hard images. In described embodiment, image engine 30 forms images upon media 16. An exemplary engine is a print engine including a developing assembly and a fusing assembly (not shown) to respectively form images using developing material, such as toner, and to affix the developing material to media 16. Image engine 30 comprising a print engine is operable to print hard images upon media 16. Other constructions or embodiments of image engine 30 are possible.

According to aspects of the present invention, processing circuitry 28 is configured to assist with maintenance and replenishment of consumables used within image forming device 14. As described herein, processing circuitry 28 of image forming device 14 is arranged to initiate search operations of devices 12 within network 11 to assist with replenishment of consumable 32 within image forming device 14. For example, in some aspects of the invention, processing circuitry 28 monitors moments in time and is configured according to such exemplary aspects to initiate searching operations of network 11 at predetermined moments in time (e.g., weekly, monthly, biannually or other desired time frames).

Alternatively, sensor 24 is arranged to monitor the status of consumable 32 and to generate a signal communicated via bus 36 to processing circuitry 28 to indicate the status of consumable 32. Responsive to the consumable reaching a predetermined status (e.g., consumable empty, 10% of consumable remaining, etc.), processing circuitry 28 implements search operations described below. Other triggering events may be utilized to initiate consumable maintenance and replenishment functionality including searching operations described herein.

According to aspects of the invention, the processing circuitry 28 is configured to formulate and forward a search request to network 11 using interface 20. The search request identifies the consumable, the brand of consumable, image forming device 14 and other information, such as the administrator or other individual responsible for maintaining consumables.

According to aspects of the invention, the formulated search request may initiate broad general searches within network 11. According to other aspects, identifiers of network devices 12 may be stored within memory 22. When proper, processing circuitry 28 accesses the identifiers from memory 22 and addresses search requests to appropriate network devices 12 using the identifiers. Exemplary identifiers comprise uniform resource locator (URL) identifiers, e-mail address identifiers and other identifiers are possible. A formulated search request is forwarded to interface 20 and communicated to the appropriate network devices 12 of network 11. The identifiers may be tailored to the specific application of image forming device 14 and can direct the search request to a retailer, supplier, or manufacturer of the consumable, for example.

Thereafter, image forming device 14 receives information regarding consumables identified within the search request from devices 12. Network devices 12 communicate information regarding the consumable 32 responsive to the search request. The information is received within interface 20 and accessed by processing circuitry 28 in the described embodiment.

In another arrangement, processing circuitry 28 of image forming device 14 forwards information regarding consumable 32 to an external device such as a host device or one of network devices 12. In this embodiment, the external device, comprising for example a server, performs searching operations of network 11. The external device receives the search results and forwards the results to image forming device 14 for appropriate communication to a user.

Depending upon the search request, the information may come from numerous parties associated with respective network devices 12 and all of the search information may not be relevant. For applications wherein the search request is communicated to specific network devices 12 identified within memory 22, the information typically is more reliable and relevant for purposes of replenishing consumable 32. Accordingly, processing circuitry 28 disregards some of the search information according to one aspect of the invention.

Processing circuitry 28 is configured to access the received information from network devices 12 and to compare the received information according to aspects of the present invention. In particular, received information may include price or cost information with respect to consumable 32 from the different devices 12. Processing circuitry 28 is configured in one embodiment to compare the price information of consumable 32 from one network device 12 relative to the other network devices 12. Processing circuitry 28 disregards at least some information received responsive to the comparison. For example, processing circuitry 28 searches for the lowest price for a given consumable 32 and the corresponding network device 12 which forwarded the information. In this described arrangement, processing circuitry 28 disregards price information from other devices 12 which is greater than the lowest price for consumable 32 received from the given network device 12. Other comparison criteria is utilized according to other aspects. In addition, information from more than one network device 12 may be maintained to offer a selection to the user.

Processing circuitry 28 generates a message including information received from network 11 following the comparison. In the described embodiment, processing circuitry 28 generates the message including the lowest price for consumable 32 and the respective network device 12 and does not include the disregarded information. Alternatively, the message can include information from more than one network device 12 including disregarded information, if desired by the user.

Processing circuitry 28 is arranged to control communications of the message to one or more appropriate recipient. For example, processing circuitry 28 forwards the message to image engine 20 according to one aspect. Image engine 20 generates a hard image including the message.

According to another aspect, processing circuitry 28 formulates the message as an electronic message (e.g., e-mail message) for communication externally of image forming device 14, for example to a device associated with the individual responsible for maintenance of consumables. Processing circuitry 28 forwards the message to interface 20 for external communication to network devices 12, a host device (not shown) or other appropriate recipient.

In yet another aspect, processing circuitry 28 controls display 15 to depict the message for a user. Alternatively, display 15 is controlled to query a user whether they wish to receive the message and in which format. In addition, processing circuitry 28 may communicate the message in more than one format (i.e., hard image, e-mail, display) if desired. Further, the message may be communicated in other ways according to other aspects of the invention. For example, the search results and/or the generated message may be stored within image forming device 14 using Job Retention.

Referring to FIG. 3, an exemplary methodology performed by image forming device 14 to assist with maintenance and/or replenishment of one or more consumable is illustrated. The depicted methodology illustrates exemplary aspects of the invention and other methods are encompassed within the present invention. Executable code for implementing the methodology of FIG. 3 is provided within memory 22 in the described embodiment. Processing circuitry 28 executes such code to implement the depicted methodology. Other embodiments or implementations are possible.

Referring initially to a step S10, processing circuitry 28 determines whether initiation of search operations for consumables is proper. Exemplary triggering events described herein include predetermined moments in time and status of consumables. Other triggering events are possible. Processing circuitry 28 idles at step S10 or performs other operations until searching is proper.

Responsive to the condition of step S10 being affirmative, processing circuitry 28 proceeds to a step S12 to formulate and forward a search request to interface 20 for communication to network 11. A search request may initiate a broad search to identify suppliers of consumables within network 11, or alternatively addressed to specific network devices 12 of network 11.

At a step S14, the results from network 11 are received within image forming device 14 and accessed by processing circuitry 28.

At a step S16, and in accordance with aspects of the present invention, processing circuitry 28 compares the search results received from network 11.

At a step S18, processing circuitry 28 disregards at least one of the search results responsive to the comparison in step S16. For example, processing circuitry 28 disregards information from one network device 12 having price information greater than price information received from another network device 12. Typically, no disregarding occurs if information from only one network device 12 is received.

At a step S20, processing circuitry 28 generates a message regarding the consumable including the lowest price information received from network devices 12 of network 11 in one exemplary aspect. Alternatively, the message includes price or other information for the consumable received from more than one network device 12.

At a step S22, processing circuitry 28 forwards the message for appropriate communication. For example, the message including information regarding the consumable may be forwarded to image engine 30 for hard imaging of the message, forwarding the message to display 15, and/or forwarding the message to interface 20 for communication to an appropriate one or more network device 12 of network 11.

The protection sought is not to be limited to the disclosed embodiments, which are given by way of example only, but instead is to be limited only by the scope of the appended claims.

What is claimed is:

1. An image forming device comprising:
   an image engine configured to utilize a consumable to form hard images;
   an interface adapted to communicate with a network comprising a plurality of network devices external of the image forming device;
   memory configured to store network identifiers of the network devices;
   processing circuitry coupled with the image engine and configured to forward a search request, at a desired interval, to the interface for communication to the network, to receive information regarding the consumable from the plurality of network devices via the interface responsive to the search request, to generate a message including information received from at least one of the network devices, and to control communication of the message; and
   wherein the processing circuitry of the image forming device is configured to,
   using the network identifiers, address the search request for communication to the network devices and to thereafter forward the search request to the interface for communication to the network devices.

2. The image forming device in accordance with claim 1 wherein the network devices individually comprise an entity capable of supplying the consumable.

3. An image forming device comprising:
   an image engine configured to utilize a consumable to form hard images;
   an interface adapted to communicate with a network comprising a plurality of network devices external of the image forming device;
   processing circuitry coupled with the image engine and configured to forward a search request, at a desired interval, to the interface for communication to the network, to receive information regarding the consumable from the plurality of network devices via the interface responsive to the search request, to generate a message including information received from at least one of the network devices, and to control communication of the message;
   wherein the processing circuitry of the image forming device is configured to address the search request for communication to the network devices and to thereafter forward the search request to the interface for communication to the network devices; and
   wherein the processing circuitry is configured to generate the message comprising an electronic message, and to forward the message to the interface for communication externally of the image forming device.

4. A method of assisting with maintenance of image forming device consumables comprising:
   providing an image forming device configured to use a consumable to form a plurality of hard images;
   the image forming device communicating a search request, at a desired interval, regarding the consumable to a network including a plurality of network devices;
   responsive to the communicating step, the image forming device receiving information regarding the consumable from the network devices; and
   communicating a message including information regarding the consumable received from at least one of the network devices, wherein the communicating comprises communicating using the image forming device; and
   the image forming device storing a plurality of network identifiers of the network devices.

5. The method in accordance with claim 4 further comprising;
   the image forming device selecting information received from one of the network devices; and
   disregarding information received from another of the network devices, and wherein the communicating the message comprises communicating the message not including the disregarded information.

6. The method in accordance with claim 4 wherein the receiving comprises receiving price information of the consumable, and the selecting and the disregarding comprise comparing the price information from the one network device with the price information from the another network device and disregarding the price information from the another network device greater than the price information from the one network device.

7. The method in accordance with claim 4 further comprising detecting a predetermined moment in time, and wherein the communicating the search request is responsive to the detecting.

8. The method in accordance with claim 4 further comprising receiving a status of the consumable, and wherein the communicating the search request is responsive to the receiving the status.

9. The method in accordance with claim 4 wherein the communicating the message comprises communicating the message as an electronic message externally of the image forming device.

10. The method in accordance with claim 4 wherein the communicating comprises printing the message upon media.

11. The method in accordance with claim 4 wherein the receiving comprises receiving price information, and the communicating the message comprises communicating the message identifying at least one the network devices having the lowest price information.

12. The method in accordance with claim 4 further comprising addressing, using the image engine, the search request with the plurality of network identifiers.

13. The method in accordance with claim 4 further comprising identifying, using the image forming device, the network devices in the search request, and wherein the network devices comprise entities which are individually configured to supply the consumable.

14. The method in accordance with claim 13 wherein the communicating the search request comprises directly communicating the search request to the network devices identified in the search request and comprising retailers of the consumable.

15. The method in accordance with claim 4 wherein the communicating the message comprises displaying on a display of the image forming device.

16. The method in accordance with claim 4 wherein the communicating the message comprises communicating responsive to the receiving.

17. The method in accordance with claim 4 wherein the network devices comprise retailers of the consumable.

18. The method in accordance with claim 4 further comprising storing identification information of the network devices comprising retailers of the consumable prior to formulating the search request by the processing circuitry.

19. The method in accordance with claim 4 wherein the communicating the search request comprises communicating the search request at a plurality of different moments in time, and wherein immediately adjacent ones of the different moments in time are separated by the desired interval comprising a common length of time.

20. The method in accordance with claim 4 wherein the storing the network identifiers comprises storing the network identifiers which are electronic addresses and which are associated with respective ones of the network devices, and further comprising formulating the search request to include the electronic addresses of the network devices using the image forming device, and wherein the communicating the search request comprises communicating the search request including the electronic addresses using the image forming device.

21. The method in accordance with claim 20 wherein the network devices individually comprise an entity capable of supplying the consumable.

22. An image forming device comprising:
- an image engine configured to utilize a consumable to form hard images;
- an interface adapted to communicate with a network comprising a plurality of network devices external of the image forming device;
- processing circuitry coupled with the image engine and configured to forward a search request, at a desired interval, to the interface for communication to the network, to receive information regarding the consumable from the plurality of network devices via the interface responsive to the search request, to generate a message including information received from at least one of the network devices, and to control communication of the message;
- wherein the processing circuitry of the image forming device is configured to address the search request for communication to the network devices and to thereafter forward the search request to the interface for communication to the network devices; and
- wherein the interface receives the information regarding the consumable directly from the network devices comprising retailers of the consumable.

23. An image forming device comprising:
- an image engine configured to utilize a consumable to form hard images;
- an interface adapted to communicate with a network comprising a plurality of network devices external of the image forming device;
- processing circuitry coupled with the image engine and configured to forward a search request, at a desired interval, to the interface for communication to the network, to receive information regarding the consumable from the plurality of network devices via the interface responsive to the search request, to generate a message including information received from at least one of the network devices, and to control communication of the message;
- wherein the processing circuitry of the image forming device is configured to address the search request for communication to the network devices and to thereafter forward the search request to the interface for communication to the network devices; and
- wherein storage circuitry of the image forming device comprises identification information of the network devices comprising retailers of the consumable prior to formulation of the search request by the processing circuitry.

* * * * *

UNITED STATES PATENT AND TRADEMARK OFFICE
CERTIFICATE OF CORRECTION

| | | |
|---|---|---|
| PATENT NO. | : 7,773,240 B2 | Page 1 of 1 |
| APPLICATION NO. | : 09/861991 | |
| DATED | : August 10, 2010 | |
| INVENTOR(S) | : Travis J. Parry et al. | |

It is certified that error appears in the above-identified patent and that said Letters Patent is hereby corrected as shown below:

In column 2, line 32, delete "Fig." and insert -- Fig. 1. --, therefor.

In column 8, lines 1-2, in Claim 5, delete "comprising;" and insert -- comprising: --, therefor.

Signed and Sealed this

First Day of March, 2011

David J. Kappos
*Director of the United States Patent and Trademark Office*